United States Patent
Fitzsimmons

(10) Patent No.: US 9,090,331 B2
(45) Date of Patent: Jul. 28, 2015

(54) AIRCRAFT FLOOR SUPPORT STRUT WITH DESIGN FAILURE POINT

(75) Inventor: David Fitzsimmons, Hamburg (DE)

(73) Assignee: Airbus Operations GMBH, Hamburg (DE)

( * ) Notice: Subject to any disclaimer, the term of this patent is extended or adjusted under 35 U.S.C. 154(b) by 166 days.

(21) Appl. No.: 13/301,908

(22) Filed: Nov. 22, 2011

(65) Prior Publication Data

US 2012/0132745 A1    May 31, 2012

Related U.S. Application Data

(60) Provisional application No. 61/417,289, filed on Nov. 26, 2010.

(30) Foreign Application Priority Data

Nov. 26, 2010 (DE) .......................... 10 2010 062 018

(51) Int. Cl.
  *B64C 1/00* (2006.01)
  *B64C 1/18* (2006.01)
  *B64C 1/06* (2006.01)

(52) U.S. Cl.
  CPC ... *B64C 1/18* (2013.01); *B64C 1/06* (2013.01); *B64C 1/00* (2013.01)

(58) Field of Classification Search
  USPC ....... 244/118.5, 119, 121, 117 R, 138 R, 139, 244/140
  See application file for complete search history.

(56) References Cited

U.S. PATENT DOCUMENTS

| | | | | |
|---|---|---|---|---|
| 3,143,321 A | * | 8/1964 | McGehee et al. | 244/100 R |
| 4,336,868 A | * | 6/1982 | Wilson et al. | 188/376 |
| 4,593,870 A | * | 6/1986 | Cronkhite et al. | 244/117 R |
| 5,887,842 A | * | 3/1999 | Granger | 248/548 |
| 5,957,425 A | * | 9/1999 | Conway et al. | 248/548 |
| 5,988,598 A | * | 11/1999 | Sicking et al. | 256/13.1 |
| 6,374,570 B1 | * | 4/2002 | McKague, Jr. | 52/762 |
| 6,718,713 B2 | * | 4/2004 | McKague et al. | 52/309.13 |
| 7,845,594 B2 | * | 12/2010 | Poggi | 244/117 R |
| 8,047,465 B2 | * | 11/2011 | Payen | 244/17.11 |
| 8,123,166 B2 | * | 2/2012 | Meyer | 244/119 |
| 8,163,368 B2 | * | 4/2012 | Kismarton | 428/113 |
| 8,376,275 B2 | * | 2/2013 | Bolukbasi et al. | 244/119 |
| 2008/0023582 A1 | * | 1/2008 | Payen | 244/17.11 |
| 2008/0023583 A1 | * | 1/2008 | Payen | 244/17.11 |

(Continued)

FOREIGN PATENT DOCUMENTS

| DE | 202006016041 U1 | 2/2007 |
|---|---|---|
| DE | 10 2006 058 377 A1 | 6/2008 |
| DE | 102006056440 A1 | 6/2008 |

(Continued)

OTHER PUBLICATIONS

German Office Action for counterpart German Application No. 10 2010 062 018.1, dated Dec. 18, 2012, 10 pages.

*Primary Examiner* — Tien Dinh
*Assistant Examiner* — Michael A Fabula
(74) *Attorney, Agent, or Firm* — Carter, DeLuca, Farrell & Schmidt, LLP

(57) ABSTRACT

A support strut designed as a passive safety strut for the support of a floor structure of an aircraft including a local instability formed by a strut section. For example, for purposes of defining a design fracture point in the event of unusual compressive loading to improve the safety of the occupants of the aircraft.

11 Claims, 4 Drawing Sheets

(56) References Cited

U.S. PATENT DOCUMENTS

2008/0093503 A1    4/2008  Cacciaguerra
2008/0210817 A1*   9/2008  Gregg et al. .................. 244/119
2009/0206202 A1*   8/2009  Bolukbasi et al. ............ 244/121
2011/0042513 A1*   2/2011  Milliere et al. ............... 244/121
2013/0112811 A1*   5/2013  Mayer et al. .................. 244/119

FOREIGN PATENT DOCUMENTS

| | | |
|---|---|---|
| DE | 102006058377 A1 | 6/2008 |
| DE | 10 2007 028 098 A1 | 12/2008 |
| DE | 102009012472 A1 | 9/2010 |
| FR | 2927606 A1 | 8/2009 |
| FR | 2954430 A1 | 6/2011 |

* cited by examiner

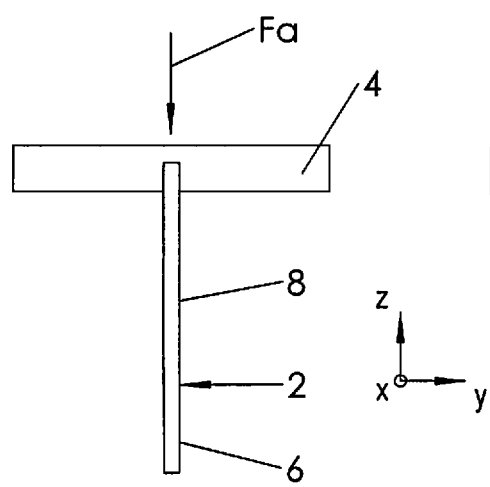
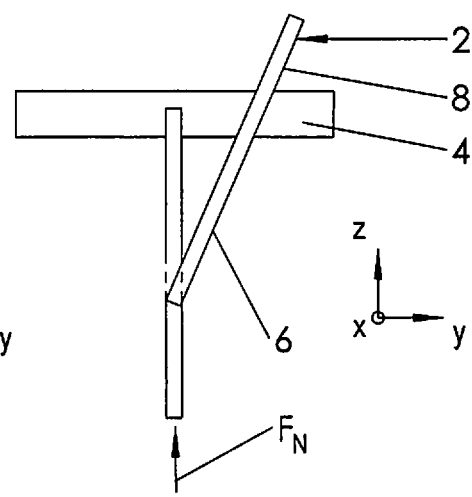
Prior art
Fig. 1a
Prior art
Fig. 1b
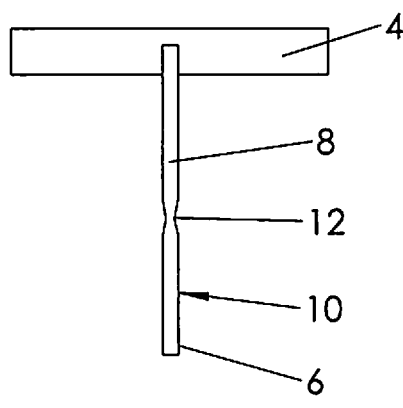
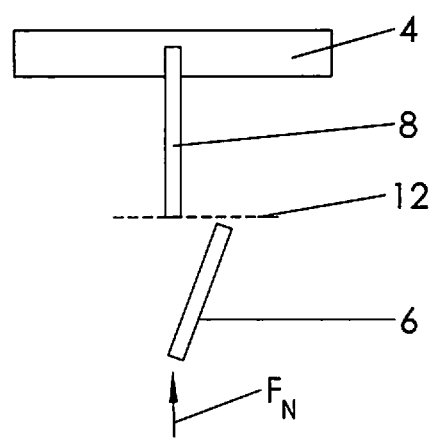
Fig. 2a
Fig. 2b

AIRCRAFT FLOOR SUPPORT STRUT WITH DESIGN FAILURE POINT

TECHNICAL FIELD

The present invention concerns a support strut for the support of a floor structure of an aircraft.

BACKGROUND

Floor structures for passenger aircraft usually consist of a multiplicity of transverse beams and seating rails. The seating rails serve to accommodate passenger seats, and run in the longitudinal direction of the aircraft over the transverse beams. The transverse beams are connected at their ends to lateral frame sections of the aircraft fuselage. Floor plates are positioned between the seating rails on the transverse beams. As shown in FIG. 1 support struts 2 can be provided for the vertical support of the floor structure 4. In the majority of cases the support struts 2 are supported via a foot section 6 on an underfloor frame section, not shown, and are connected via a head section 8 with the transverse beams of the floor structure 4. Normally they serve to accommodate axial compressive forces Fa introduced in the head section 8 along the vertical axis z of the aircraft. In the event of a crash, or an emergency landing with the undercarriage retracted, i.e. with direct contact of the underfloor region with the ground, as a result of a deformation of the frame sections in the underfloor region large compressive loads Fn can be introduced axially in the region of the foot section 6 into the support struts 2 such that these, as shown in FIG. 1b, are torn out of their head anchorages and penetrate the cabin floor laid down on the floor structure 4, signifying a hazard to the crew members and passengers in this region.

In the applicant's German patent application DE 10 2006 058 377 A1 is shown a support strut designed as a cylindrical Samer rod, which is covered with a fabric net. In the event of an unusual axial tensile loading as a consequence of a an emergency landing the fabric net serves as a quasi capture net, and in the event of damage to the Samer rod prevents the structural elements connected with one another via the Samer rod from being separated from one another. The Samer rod and in particular the fabric net are extremely well suited for purposes of stabilising the aircraft structure in the event of unusual tensile loads, but only to a limited extent for purposes of avoiding a hazard for the cabin personnel or passengers if extraordinary compressive loads occur.

From the German patent application DE 10 2007 028 098 A1 it is of known art to support a floor structure in the aircraft fuselage only by means of horizontal struts or bars, which extend from their ends on the transverse beams. The transverse beams are indirectly connected via the bars to lateral frame sections. There is no direct attachment of the transverse beams to the frame sections or the vertical support struts. However, this design is critical in the event of a crash in that no vertical support of the floor structure is provided.

The object of the present invention is to create a support strut for the support of a floor structure of an aircraft, which removes the above-cited disadvantages and in the event of unusual compressive loading, occurring, for example in the event of a crash, does not penetrate the floor.

SUMMARY

In accordance with the invention a support strut for the support of a floor structure of an aircraft has a local instability, formed by a strut section, for purposes of improving the safety of the occupants of the aircraft. The local instability, i.e. the strut section, ensures that when a certain axial compressive loading is exceeded the support strut connected to the floor structure can be deformed or fractured in a defined region of the strut, and thus is not torn out of the head anchorage with the floor structure, as a result of which any penetration of the floor is reliably prevented. The inventive support strut acts as a passive safety strut, which supports the floor structure even in the event of a crash, and by means of its deformation prevents any penetration of the floor plates. In this manner the floor structure and the floor plates are virtually undamaged, or not damaged at all, and the inventive support strut ensures the integrity of the passenger cabin in the floor region, which results in an improved level of safety for the occupants of the aircraft compared with solutions of known art. At the same time impact energy is absorbed by means of the deformation of the one or more support struts, and the effect of the impact on the occupants of the aircraft is lessened, as a result of which the safety of the occupants of the aircraft is likewise improved.

In a preferred example of embodiment the strut section is arranged in a central profile region of the support strut, so that the support strut is subdivided into two equal or approximately equal parts.

Depending on the profile prescribed for the support strut the strut section can have a similar or a different type of profile geometry. From the point of view of production engineering a similar profile is simple to produce, whereas a different type of profile makes possible a particularly optimal design for the strut section.

One example of embodiment envisages that the support strut is designed in one piece with an integral strut section. Another example of embodiment envisages that the support strut is embodied in at least two parts, wherein the strut section is designed integrally, i.e. in one piece, with the one profile section, and is connected by means of an appropriate connection with the other profile section. In a further example of embodiment the support strut consists of at least two individual profiles, which are connected with one another by means of a strut section that is manufactured separately. The separate manufacture of the strut section from the other support strut profiles enables the retrofitting of conventional support struts that are already installed in the aircraft.

In the multi-part examples of embodiment the strut section forms an overlap joint with at least one profile section. An overlap joint is simple to manufacture in technical terms and makes possible the compensation of component and assembly tolerances.

In the region of the at least one overlap joint the strut section can be connected with the profile section by means of a material bond, a force fit, or a form fit. Here the respective connection can be designed such that in the event of a compressive axial overload the connection is released and the strut section does not buckle or fracture.

In addition to the geometry, and the type of connection it is also possible to vary the material of the strut section and/or to adapt it to the respective loading case. Thus the strut section can consist of the same material as the profile sections of the support strut, or of another material.

Other advantageous examples of embodiment of the invention are the subject of further subsidiary claims.

BRIEF DESCRIPTION OF THE DRAWINGS

In what follows preferred examples of embodiment of the present invention are elucidated in more detail with the aid of schematic representations. Here:

FIGS. 1a and 1b show a conventional support strut for the support of a floor structure of an aircraft, FIGS. 2a and 2b show a first example of embodiment of an inventive support strut.

DETAILED DESCRIPTION

Figure 3:
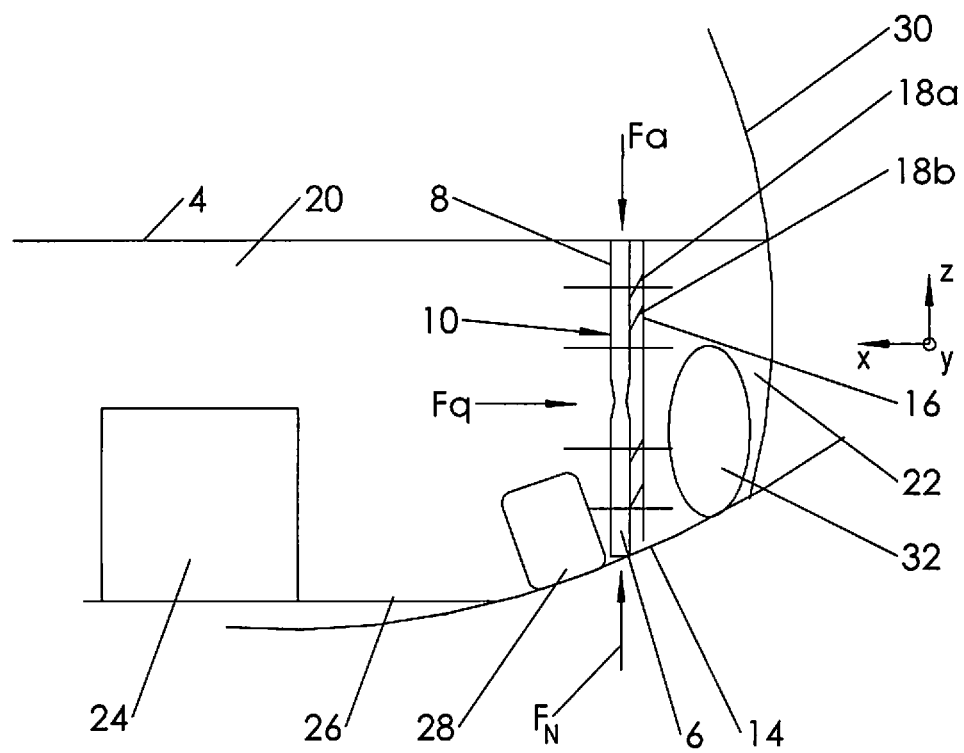
FIGS. 3 and 4 show a preferred installation position for the inventive support strut from FIGS. 2a and 2b.

In accordance with the representation in FIG. 2a an inventive support strut 10 for the vertical support of a floor structure 4 of an aircraft has a foot section 6 for purposes of support on a stiffening element, not shown, in the underfloor region, a head section 8 for purposes of attachment to the floor structure 4, and, arranged between the foot section 6 and the head section 8, a strut section 12 defining a local instability.

The foot section 6 and the head section 8 consist of the same material such as aluminium, titanium, or a fibre-reinforced composite material such as CFRP, and have the same geometry and the same axial length.

The strut section 12 preferably consists of the same material as the foot section 6 and the head section 8, and by virtue of the equal axial length of the foot section 6 and the head section 8 is arranged in a central profile section of the support strut 10. In the example of embodiment shown in FIGS. 2 to 4 the support strut 10 is designed in one piece with an integral strut section 10; however, the support strut can also be embodied in a number of parts, as shown in FIG. 5.

In accordance with an emergency situation as indicated in FIG. 2b the strut section 12 defines a design fracture point, at which the support strut 10 fractures or bends in the event of an unusual axial compressive load FN, which is introduced via the foot-side foot section 6 into the support strut 10, for example as a result of contact of the aircraft fuselage with the ground in an emergency landing. By this means the support strut 10 is prevented from being released from its head-side anchorage on the floor structure 4 and thus penetrating through the floor. The head section 8, inventively separated from the foot section 6, remains in fact in its anchorage with the floor structure 4.

Figure 4:
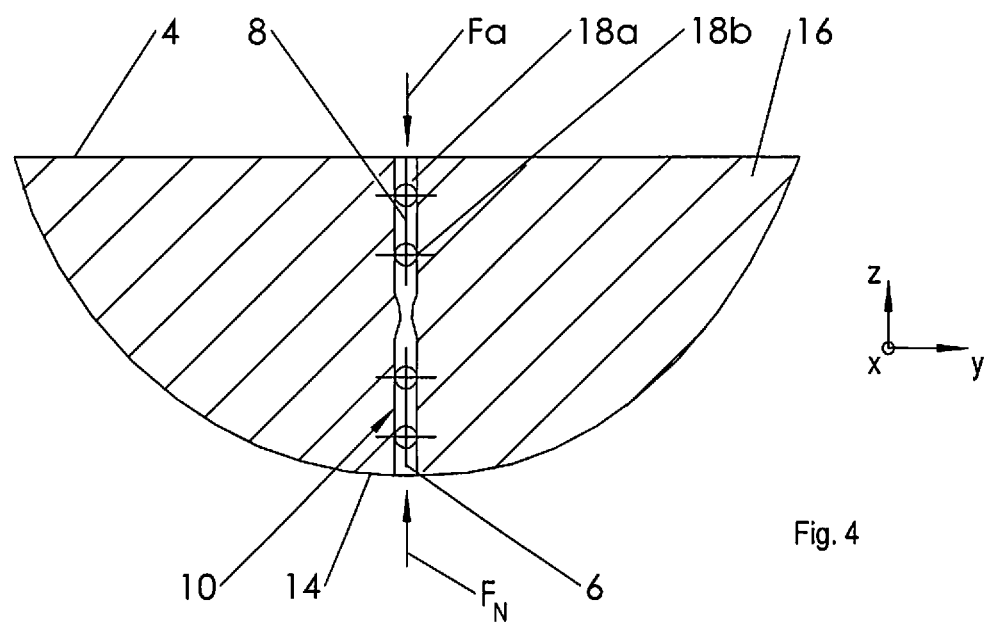
Figure 5:
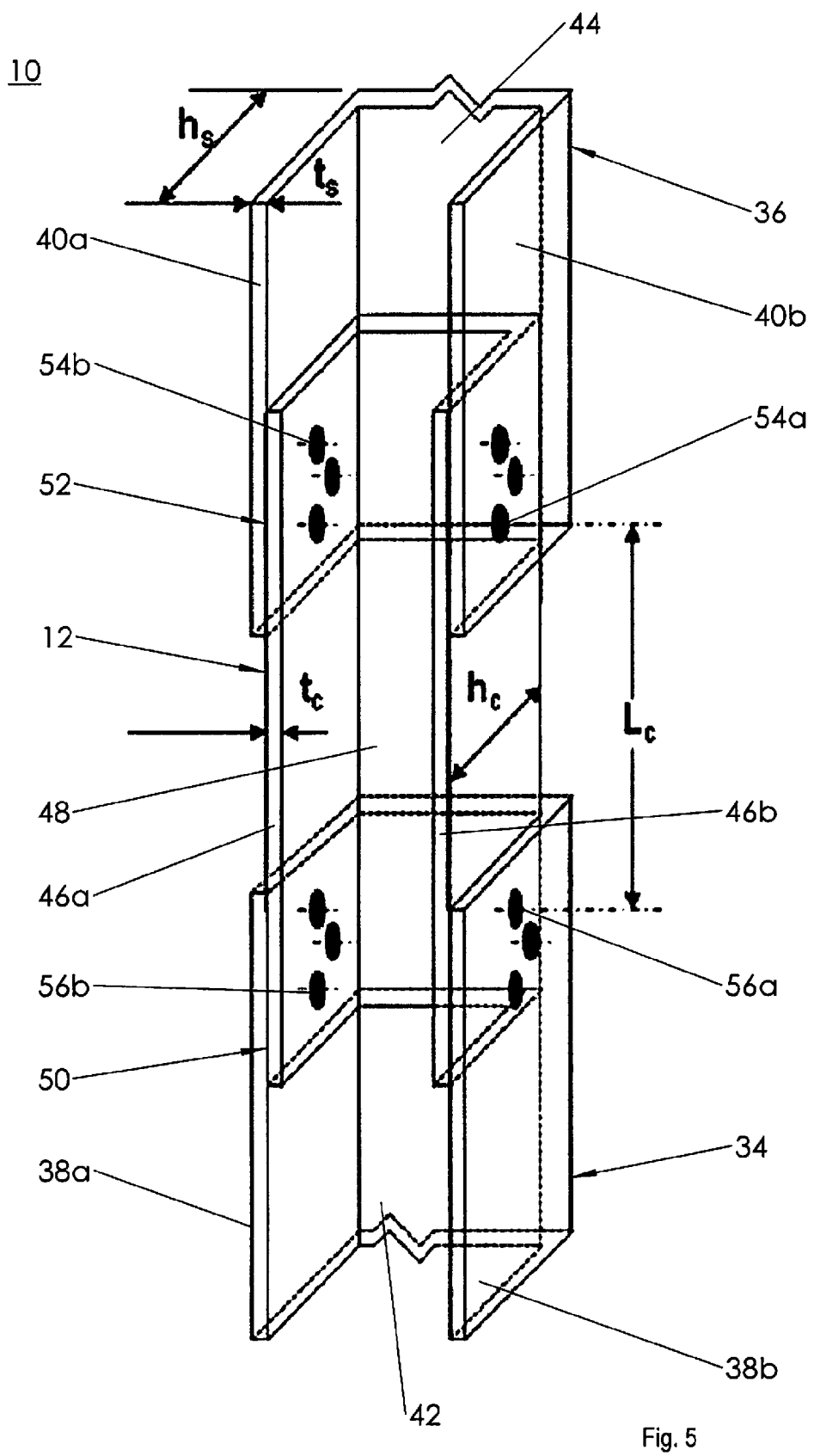
FIG. 5 shows a perspective representation of a second example of embodiment of an inventive support strut.

FIGS. 3 and 4 represent a preferred installation position of the inventive support strut 10 on an aircraft. The support strut 10 is preferably arranged centrally in the transverse direction y in a rear region of the aircraft fuselage for the vertical support of the floor structure 4. It is supported with its foot section 6 via an underfloor stiffening element, not shown, on a rear skin section 14 of the aircraft fuselage, and is connected with its head section 8 to the floor structure 4.

In addition to supporting the floor structure 4 the support strut 10 serves for the attachment of a panel element 16, which in the underfloor region extends over the cross-section of the aircraft fuselage, and is connected to the support strut 10 by means of rivets 18a, 18b. The panel element 16 forms a rear-side boundary of a freight compartment 20 and a cockpit-side boundary of a systems compartment 22.

The freight compartment 20 serves to accommodate a multiplicity of freight containers 24, which are tethered to a freight compartment floor 26. Hand luggage 28 is also transported in the freight compartment 20; this is positioned in a free space between the freight containers 24 and the panel element 16. The hand luggage 28 is mostly stored without any tethering to the structure of the freight compartment 20, as a result of which, in the event of turbulence, for example, it can be pressed against the panel element 16. The panel element 16 prevents any movement of the hand luggage 28 into the systems compartment 22; however, as a result of the attachment of the panel element 16 to the support strut 10, the forces Fq in the longitudinal direction x of the aircraft that are present in the panel element 16 are introduced into the support strut 10, so that the latter also has to accommodate transverse forces Fq in addition to the axial forces.

At its rear the systems compartment 22 is bounded by a pressure bulkhead 30 and serves to accommodate items of equipment relevant to the aircraft systems, such as e.g. a water tank 32.

FIG. 5 shows the inventive support strut 10 in a multi-part embodiment with a foot-side profile section 34 and a head-side profile section 36, which are connected with one another via a central strut section 12 acting as a local instability. The profile sections 34, 36 preferably consist of aluminium, or an aluminium alloy, and in each case have a U-shaped cross-section with two parallel flanges 38a, 38b and 40a, 40b, which in each case are connected with one another via a web 42 and 44. The flanges 38a, 38b, 40a, 40b have a uniform height hs and a uniform thickness, i.e. wall thickness, ts. The panel element 16 shown in FIGS. 3 and 4 is preferably connected to the webs 42, 44.

The strut section 12 consists of the same material as the profile sections 34, 36, and has a profile geometry corresponding to, i.e. similar to, the profile sections 34, 36, with two parallel flanges 46a, 46b and a web 48 for purposes of connecting the flanges 46a, 46b. The flanges 46a, 46b have a height hc and a thickness, i.e. wall thickness, tc, where hc<hs and tc<ts. The strut section 12 has a U-shaped cross-section that is reduced relative to the profile sections 34, 36, such that the ends of the strut section 12 fit inside between the flanges 38a, 38b, 40a, 40b of the profile sections 34, 36 and in each case form an overlap joint 50, 52 with the latter. The connection of the strut section 12 with the profile sections 34, 36 preferably takes place by means of a multiplicity of attachment means such as bolts, rivets 54a, 54b and 56a, 56b and similar, which are inserted into corresponding location holes in the flanges 38a, 38b, 40a, 40b of the profile sections 34, 36, and also in the flanges 46a, 46b of the strut section 12.

Figure 6:
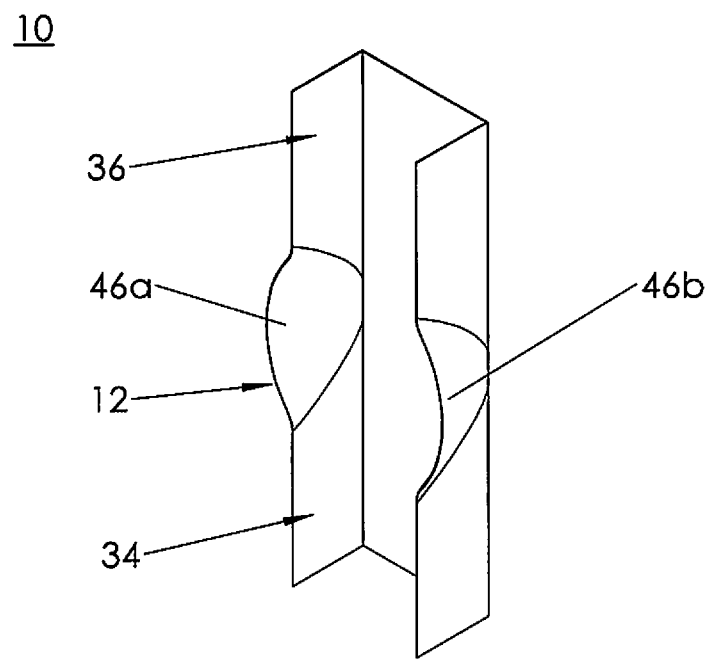
FIG. 6 shows a loading case for the inventive support strut.

The ratios between the height hs and the thickness ts of the flanges 38a, 38b, 40a, 40b of the profile sections 34, 36, and the height hc, the thickness tc of the strut section 12 and a free length Lc between the inner attachment means 54a, 56b, as viewed in the axial direction, are selected such that the support strut 10 has a sufficient passive stiffness, but the transfer of an unusual compressive loading, for example as a consequence of an emergency landing, with contact of the rear of the aircraft with the ground, is prevented by means of fracture or deformation of the strut section 12. As shown in FIG. 6 the deformation can, for example, take the form of buckling of the flanges 46a, 46b of the strut section 12, which can be adjusted by means of the free length Lc, amongst other factors.

Furthermore FIG. 5 illustrates that the strut cross-section 12 serving as a local instability can also be retrofitted into a conventional support strut 2 as shown in FIG. 1. For this purpose a central profile section of the support strut 2 is removed, so that the foot section 6 is separated from the head section 8. The strut section 12 is then positioned between the sections 6, 8 and connected with the sections 6, 8 to form a support strut 10 with a local instability.

Figure 7A:
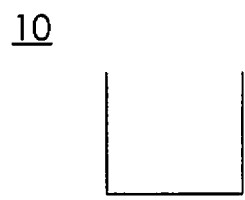
FIGS. 7a, 7b and 7c show exemplary profile cross-sections of inventive support struts.
Figure 7B:
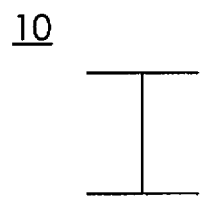
Figure 7C:
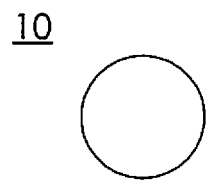

In accordance with the cross-sectional representations in FIGS. 7A, 7B, 7C the support strut 10 can have a multiplicity of cross-sectional profiles. As shown in FIG. 7A, and earlier in FIGS. 5 and 6, one example of embodiment envisages designing the support strut 10 with a U-shaped cross-section. Alternatively a support strut 10 is shown in FIG. 7B, which has an I-shaped, i.e. a double T-shaped, cross-section. In addition an example of embodiment of an inventive support strut 10 is shown in FIG. 7C, with a circular, i.e. cylindrical, cross-section.

Disclosed is a support strut designed as a passive safety strut for the support of a floor structure of an aircraft, with a local instability formed by a strut section, for example for purposes of defining a design fracture point in the event of unusual compressive loading, for purposes of improving the safety of the occupants of the aircraft.

REFERENCE SYMBOL LIST

2 Support strut
4 Floor structure
6 Foot section
8 Head section
10 Support strut
12 Strut section
14 Skin section
16 Panel element
18a, b Rivet
20 Freight compartment
22 Systems compartment
24 Freight container
26 Freight compartment floor
28 Hand luggage
30 Pressure bulkhead
32 Water tank
34 Profile section
36 Profile section
38a, b Flange
40a, b Flange
42 Web
44 Web
46a, b Flange
48 Web
50 Overlap joint
52 Overlap joint
54a, b Attachment means
56a, b Attachment means
Fa Axial compressive load
FN Overload
Fq Transverse force
hs Height of profile section flange
ts Thickness of profile section flange
hc Height of strut section flange
tc Thickness of strut section flange
Lc Free length (distance between inner attachment means)

The invention claimed is:

1. A support strut for the support of a floor structure of an aircraft, comprising:
   a strut section having a region forming a design fracture point for improving the safety of the occupants of the aircraft; and
   a head section attached to the floor structure of the aircraft;
   wherein the head section forms an overlap joint with the strut section;
   wherein the region of the strut section forming the design fracture point is positioned outside of the overlap joint;
   wherein the strut section and the head section each have a U-shaped cross-section with two parallel flanges connected by a web;
   wherein the flanges of the strut section have a uniform height and a uniform thickness along an entire length of the strut section;
   wherein the cross-section of the strut section is reduced in size relative to the cross-section of the head section; and
   wherein the strut section is arranged in a central profile region of the support strut.

2. The support strut in accordance with claim 1, wherein the strut section is connected with the head section by means of a material bond.

3. The support strut in accordance with claim 2, wherein in the event of an axial overload the design fracture point of the strut section deforms.

4. The support strut in accordance with claim 1, wherein the strut section consists of a material other than that of head section.

5. A support strut for the support of a floor structure of an aircraft, comprising:
   a head section attached to the floor structure of the aircraft;
   a foot section supported by a fuselage of the aircraft; and
   a strut section having a region forming a design fracture point between the head and foot sections;
   wherein the strut section forms an overlap joint with each of the head and foot sections;
   wherein the design fracture point is positioned outside of the overlap joints;
   wherein the strut section has a U-shaped cross-section with two parallel flanges connected by a web; and
   wherein the flanges have a uniform height along an entire length of the strut section.

6. The support strut in accordance with claim 5, wherein the strut section is connected with the head section by means of a material bond.

7. The support strut in accordance with claim 5, wherein the strut section is connected with the foot section by means of a material bond.

8. The support strut in accordance with claim 5, wherein in the event of an axial overload the design fracture point of the strut section deforms.

9. The support strut in accordance with claim 1, wherein the strut section consists of a material other than that of the head and foot sections.

10. The support strut in accordance with claim 1, further comprising:
    a foot section supported by a fuselage of the aircraft;
    wherein the foot section forms an overlap joint with the strut section; and
    wherein the strut section is positioned between the head and foot sections.

11. The support strut in accordance with claim 1, wherein the strut section is connected with the head section by means of at least one of bolts and rivets.

* * * * *